March 10, 1970  D. COHEN  3,499,536
FILTER APPARATUS
Filed July 17, 1967
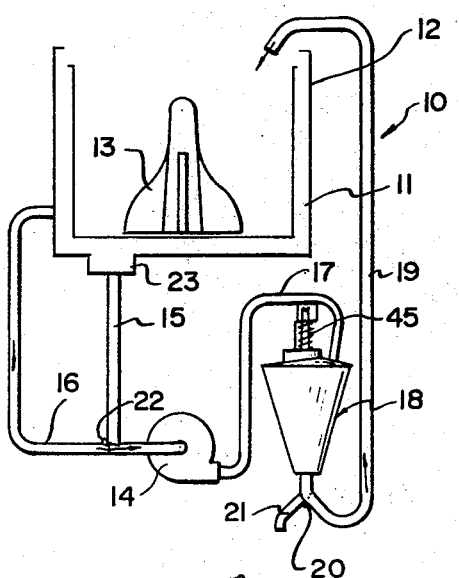
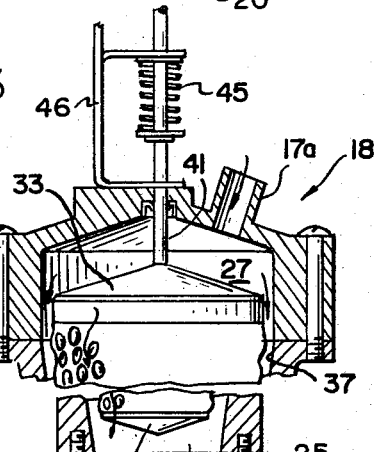
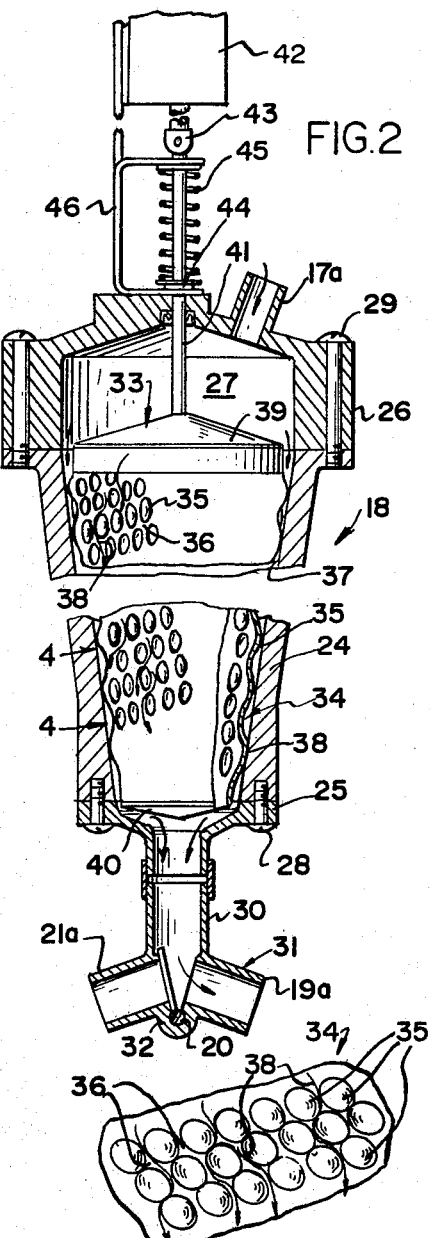
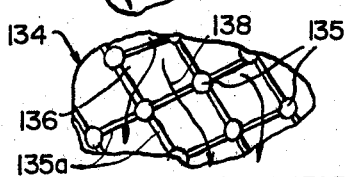
INVENTOR.
DAVID COHEN
BY Hofgren, Wegner, Allen, Stellman & McCord
ATTORNEYS.

United States Patent Office 3,499,536
Patented Mar. 10, 1970

3,499,536
FILTER APPARATUS
David Cohen, St. Joseph, Mich., assignor to Whirlpool Corporation, a corporation of Delaware
Filed July 17, 1967, Ser. No. 653,837
Int. Cl. B01d 35/22, 29/00
U.S. Cl. 210—391    18 Claims

ABSTRACT OF THE DISCLOSURE

A filter apparatus for removing lint and similar material from wash water including means for rearranging the apparatus to permit self-cleaning thereof by passage of wash-off liquid therethrough. The filter apparatus includes a textured filter surface providing a plurality of tortuous filter flow paths functioning to trap the material to be filtered therein during the filtering fluid flow therethrough.

---

This invention relates to filter apparatus and in particular to self-cleaning filter apparatus.

In clothes washing machines and the like, it is desirable to provide filtering means for removing lint and similar material from the wash water. For this purpose, a number of different forms of lint filters have been employed. One form of such lint filter comprises a filter apparatus installed in the wash water recirculation line and through which the wash water is pumped during the washing cycle to remove the lint and similar material therefrom continuously during the washing operation. One problem arising with known lint filters of this type is the repeated necessity of removing the collected filtered material. Thus, on one hand, it is desirable to arrange the filter apparatus so as to effectively positively retain the filtered material during the washing cycle, while, on the other hand, it is desirable to permit ready removal thereof during a subsequent cleaning operation. Another problem arising in such known filters is the inability thereof to effectively remove lint particulate material of small size. Where the filter flow passages are made sufficiently small to entrap such small lint particulates, they have been found to tend to rapidly clog up with resultant reduced efficiency of operation of the filter. The present invention comprehends an improved filter apparatus which effectively eliminates the above discussed disadvantages of the known filter apparatuses in a novel and simple manner.

Thus, a principal feature of the present invention is the provision of a new and improved filter apparatus.

Another feature of the invention is the provision of such a filter apparatus having a new and improved fluid filtering means permitting facilitated self-cleaning thereof.

A further feature of the invention is the provision of such a filter apparatus utilizing a relatively rounded textured wall means cooperating with an opposed wall means for defining a plurality of filter flow passages to provide an improved filtering action.

Another feature of the invention is the provision of such a filter apparatus wherein the textured wall means defines a plurality of rounded lint collecting peaks providing for facilitated removal of the collected material in the wash-off operation.

A yet further feature of the invention is the provision of such a filter apparatus wherein the peak portions of the textured wall means are relatively widely spaced and function to collect material to be filtered, which filtered material in turn tends to collect further smaller material thereby effectively filtering both large and small size lint particulate material while maintaining relatively clear flow passages through the filter apparatus for maintained efficiency of operation.

Another feature of the invention is the provision of such a filter apparatus wherein both the filtering and wash-off operations are conducted by flowing the fluid through the filter in the same general direction.

A further feature of the invention is the provision of such a filter apparatus including first, generally smooth surfaced wall means, second wall means having a textured surface defining a plurality of rounded peaks and valleys for selectively cooperating with the first wall means in a juxtaposed position to define a plurality of tortuous filtering flow passages therebetween through which fluid to be filtered is flowed, and in a spaced position to define a wash-off flow path therebetween through which wash-off fluid is flowed, and means for selectively disposing the second wall means in the juxtaposed and spaced positions.

Still another feature of the invention is the provision of such a filter apparatus wherein the textured surface is arranged to define a plurality of tortuous filtering flow passages decreasing in size in the direction of flow of the fluid to be filtered therethrough.

A yet further feature of the invention is the provision of such a filter apparatus wherein one of the wall means is flexible for improved conformity thereof with the other wall means in defining the filter flow passages.

Another feature of the invention is the provision of such a filter apparatus wherein one of the wall means defines a narrowing chamber, with the other wall means being disposed therein and with the fluid flow inlet to the chamber being at the large end thereof.

Other features and advantages of the invention will be apparent from the following description taken in connection with the accompanying drawing wherein:

FIGURE 1 is a schematic illustration of a washing machine provided with a filter apparatus embodying the invention;

FIGURE 2 is a fragmentary enlarged diametric section of the filter apparatus in the filtering arrangement;

FIGURE 3 is a fragmentary diametric section thereof in the wash-off arrangement;

FIGURE 4 is a fragmentary elevation of the textured wall element taken substantially along the line 4—4 of FIGURE 2;

FIGURE 5 is a fragmentary elevation of a modified form of textured wall element; and FIGURE 6 is a fragmentary diametric section of another form of filter apparatus embodying the invention.

In the exemplary embodiment of the invention as disclosed in FIGURES 1 through 4 of the drawing, a washing machine generally designated 10 is shown to comprise a basket 11 provided with a tub 12 wherein articles to be washed, such as clothing (not shown) are subjected to a washing liquid (not shown) while being agitated by a conventional agitator 13. During the washing operation, the washing liquid is continuously recirculated by means of a pump 14 which draws the washing liquid from adjacent the bottom of the tub 12 through conduit 16 and delivers it through a conduit 17 to a filter apparatus generally designated 18 wherein lint and similar particulate materials are removed from the washing liquid. The washing liquid is then directed back into the tub 12 through a return conduit 19. A suitable valve 20 may be provided for directing the wash liquid selectively to the return conduit 19 or to a drain conduit 21. Thus, as shown in FIGURE 2, during the washing cycle, the valve 20 closes the drain conduit 21 and allows fluid flow through conduit 19, whereas in the drain cycle as shown in FIGURE 3, valve 20 closes the return conduit 19 and permits flow outwardly through the drain conduit 21.

During the recirculative washing cycle, a level of washing liquid is maintained in the tub 12 by withdrawing the washing liquid through the conduit 16. A conduit 15, selectively closed by a suitable valve 22, communicates with the bottom of the tub through a sump 23, and during the drain cycle, the valve 22 is positioned to permit delivery of washing liquid downwardly through conduit 15 to pump 14 to effectively completely drain the tub.

Turning now to FIGURES 2 and 3, the filter apparatus 18 of the present invention may be seen to comprise a first, tapered wall member 24 provided at its lower end with a bottom plate 25 and at its upper end with a cover 26 to define an internal filter chamber 27. The bottom plate 25 may be secured to the wall member 24 by suitable means such as screws 28, and the cover 26 may be secured to the wall member 24 by suitable means such as screws 29. The bottom plate 25 may be provided with a depending connector portion 30 defining a bifurcated end 31 including a first connector portion 19a and a second connector portion 21a for connection of conduits 19 and 21 respectively thereto. The connector end 31 further defines a housing portion 32 for mounting the valve 20. The cover 26 may be provided with a connector 17a to which the conduit 17 may be connected for delivering the fluid into the top portion of the filter chamber 27.

Movably disposed within chamber 27 is a mandrel 33 having a side wall 34 tapered complementarily to the frusto-conical wall member 24. In the illustrated embodiment, the wall members 24 and 34 are frusto-conical having a taper angle of approximately 8° to the axis thereof. As best shown in FIGURE 4, the side wall 34 of the mandrel herein comprises an undulate wall structure having a plurality of peaks 35 and valleys 36 formed from a textured stainless steel sheet having a thickness between .005 and .020 inch.

The pattern depth (depth of the valleys 36 below the apices of the rounded peaks 35) of the textured stainless steel sheet lies between .01 and .10 inch. The wall member 24, bottom plate 25, and cover 26 may be formed of a suitable material such as metal or plastic as desired. When side wall 34 is in cooperative engagement with the smooth, or regular, inner surface 37 of wall member 24, a plurality of tortuous flow passages 38 are formed. While the textured wall 34 is illustrated as forming a portion of the mandrel 33 and the smooth surface 37 is shown as being the inner surface of the wall 24, the disposition of the textured surface and smooth surface may be reversed within the scope of the invention. Further, while in the preferred form, the textured wall comprises a textured metal sheet member, other forms of such a textured wall, such as a molded plastic structure, may be employed within the scope of the invention.

The mandrel 33 further includes a top member 39 and a bottom member 40. A shaft 41 upstands from top member 39 through cover 26 and is connected to a conventional solenoid 42 by a suitable connector 43. The shaft is provided with a collar 44, and a coil spring 45 is compressed between a bracket 46 carried on the cover 26 and the collar 44 to bias the shaft 41, thus, the mandrel 33 downwardly, as shown in FIGURE 2, thereby to engage the peaks 35 of the side wall member 34 with the relatively smooth surface 37 of the complementary wall member 24. Preferably, at least approximately a majority of the peaks 35 contact the surface 37, and in the illustrated embodiment, substantially all of the peaks engage the surface 37 to provide effectively maximum tortuous flow passage means. To assure such engagement, at least one of the wall member 24 and mandrel 33 is made flexible whereby the flexible element may be caused to have conformity with the other member by the urging action of the spring 45. In the illustrated embodiment, the textured metal sheet member 34 is made semirigid to provide the desired flexible conformability.

Thus, during the wash cycle of operation of washing machine 10, washing liquid is flowed into the upper, enlarged end of chamber 27 and downwardly through the tortuous passages 38 defined cooperatively by the textured wall 34 and the generally smooth wall 37. Spring 45 maintains the peaks 35 of the mandrel 33 in engagement with the wall surface 37 whereby the wash water in flowing through the tortuous paths 38 flows turbulently, causing lint and similar material in the wash water to cling to and tend to wrap around the relatively narrow peak portions 35. The larger lint and similarly particulate material tends to collect first and subsequently entrain smaller particles. By virtue of the conical construction of the filter apparatus 18, a relatively large filter area is provided, while yet the apparatus is volumetrically relatively small.

Upon completion of the washing cycle, the valves 20 and 22 are repositioned to drain the tub 12 and pass the wash water outwardly through the drain conduit 21. During this operation, the solenoid 42 is energized to overcome the spring 45 and raise the mandrel 33, as shown in FIGURE 3, to space the textured wall surface 34 from the wall surface 37 permitting the collected lint and particulate material to be washed from the surface 34 and discharged with the wash water through the drain conduit. By virtue of the rounded construction of the textured surface 34, the collected lint and particulate material washes readily therefrom facilitating the effectively complete cleaning of the filter during each such drain cycle.

Thus, pump 14 may comprise a unidirectional pump as the fluid flows through the chamber 27 in the same direction during both the filtering cycle and the wash-off cycle. The simplicity of the construction of filter apparatus 18 further effectively minimizes the cost of the apparatus 10, as well as effectively minimizing maintenance thereof.

In the embodiment of FIGURES 1 through 4, the wall member 34 comprises an embossed, or textured, surface having a pattern depth of between .01 and .10 inch. In FIGURE 5, another form of textured wall member 134 found to provide excellent filtering functioning in the disclosed apparatus is provided, also having a pattern depth between .01 and .10 inch. Water to be filtered while flowing through passages 138 between the relatively taller peaks 135 must flow over raised ridges 135a which entrain lint particles too small to catch on rounded peaks 135. By virtue of the rounded construction of the wall member 134 it may be readily cleaned by the wash-off water during the drain cycle as with wall member 34.

If desired, the textured wall member may be arranged to define with the smooth wall member flow passages which decrease in size in the direction of fluid flow therethrough, as illustrated in FIGURE 6. As shown therein, the wall member 234 may be provided at its upper end with relatively large size peaks 235 and at its lower end with relatively small size peaks 235' with the flow passages 238 therebetween becoming smaller in the downward direction to provide further improved filtering of extremely small lint particulates.

Further as shown in FIGURE 6, the projection of the peaks of the textured wall member decreases with the decreasing size of the peaks so that the depth of the flow passages similarly decreases in the downward direction. Thus, the collected lint particulates may be readily removed by the washing action of the drain fluid flow therepast notwithstanding the relative decrease in the size of the flow passages between the peaks in the lower portion of the wall member 234.

In the illustrated embodiment of FIGURES 1 through 4, the inlet 17a communicates with the upper portion of the chamber 27. As will be obvious to those skilled in the art, the arrangement may be reversed so as to provide the inlet at the bottom of the chamber 27 with the fluid flow upwardly therethrough to the large end. Where the textured pattern is made to become more closely spaced, as illustrated in FIGURE 6, the wall member may be reversely arranged with the smaller flow passages at the upper end.

The embodiment of the invention in which an exclusive property or privilege is claimed is defined as follows:

1. Filter apparatus comprising: first wall means having a first surface; second wall means having a surface defining a plurality of valleys and peaks tapering toward said first wall means for selectively cooperating with said first wall means in a juxtaposed position to define a plurality of tortuous filtering flow passages therebetween through which fluid to be filtered may be flowed and in a spaced position to define a wash-off flow path therebetween through which wash-off fluid may be flowed, said peaks further cooperating with said first wall means to define means about which material to be filtered from the fluid wraps and thereby is removed from the fluid when said walls are in the juxtaposed position and which is caused to move freely off the peaks into the wash-off fluid when said walls are in the spaced position; and means for selectively disposing said second wall means in said juxtaposed and spaced positions.

2. The filter apparatus of claim 1 wherein said walls are coaxially similarly tapered.

3. The filter apparatus of claim 1 wherein said peaks define rounded apices.

4. The filter apparatus of claim 1 wherein said second wall means surface is undulate.

5. The filter apparatus of claim 1 wherein said second wall means comprises a textured sheet metal element.

6. The filter apparatus of claim 1 wherein the majority of said peaks engage said first wall means in said juxtaposed filtering position.

7. The filter apparatus of claim 1 wherein substantially all of said peaks engage said first wall means in said juxtaposed filtering position.

8. The filter apparatus of claim 1 wherein at least one of said wall means is flexible to provide general conformity thereof to the other wall means and thereby assure engagement of said peaks of said second wall means with said first wall means in said juxtaposed position.

9. The filter apparatus of claim 1 further including means biasing said second wall means peaks against said first wall means surface.

10. The filter apparatus of claim 1 further including means for causing a fluid to be filtered to flow between said wall means in a first direction and for causing a wash-off fluid to flow between said wall means in the same general direction.

11. The filter apparatus of claim 1 wherein said wall means are coaxially frusto-conical.

12. The filter apparatus of claim 1 wherein said wall means are frusto-conical and at least one of said wall means is flexible to provide conformity thereof to the other wall means and thereby assure engagement of said peaks of said second wall means with said first wall means in said juxtaposed position.

13. The filter apparatus of claim 1 wherein said walls are similarly tapered and means are provided for causing a fluid flow therebetween in the direction from the large cross sectional end of said wall means to the small cross sectional end.

14. The filter apparatus of claim 1 wherein said second wall means is arranged to have said filtering flow passages decrease in cross section in the direction of filtering fluid flow therethrough.

15. The filter apparatus of claim 1 further including means for causing a fluid to be filtered to flow between said wall means in a first direction and for causing a wash-off fluid to flow between said wall means in the same general direction and said second wall means is arranged to have said flow passages decrease in cross-section in the direction of fluid flow therethrough.

16. The filter apparatus of claim 1 wherein said peaks decrease in size in the direction of fluid flow through said filtering flow passages.

17. The filter apparatus of claim 1 wherein said peaks decrease in height in the direction of fluid flow through said filtering flow passages.

18. The filter apparatus of claim 1 wherein said first wall means defines a smooth surface confronting said peaks of said second wall means.

References Cited

UNITED STATES PATENTS 2,621,505  12/1952  Smith _____ 210—409 X
3,429,444  4/1969  Spiegel et al. _____ 210—356

REUBEN FRIEDMAN, Primary Examiner

JOHN W. ADEE, Assistant Examiner

U.S. Cl. X.R.

210—411